United States Patent
Reuter

(10) Patent No.: US 11,106,748 B2
(45) Date of Patent: Aug. 31, 2021

(54) SYSTEMS AND METHODS FOR GENERATING DIGITAL CONTENT ITEM PREVIEWS

(71) Applicants: Atlassian Pty Ltd., Sydney (AU); Atlassian Inc., San Francisco, CA (US)

(72) Inventor: Sascha Reuter, Sydney (AU)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 0 days.

(21) Appl. No.: 16/827,544

(22) Filed: Mar. 23, 2020

(65) Prior Publication Data
US 2020/0410026 A1 Dec. 31, 2020

(30) Foreign Application Priority Data
Jun. 28, 2019 (AU) .................................. 2019902266

(51) Int. Cl.
*G06F 16/9536* (2019.01)
*G06F 16/957* (2019.01)

(52) U.S. Cl.
CPC ...... *G06F 16/9536* (2019.01); *G06F 16/9577* (2019.01)

(58) Field of Classification Search
CPC .......................... G06F 16/9536; G06F 16/9577
See application file for complete search history.

(56) References Cited

U.S. PATENT DOCUMENTS

| | | | | |
|---|---|---|---|---|
| 8,578,261 | B1* | 11/2013 | Gupta ................... | G06F 16/957 715/208 |
| 10,176,152 | B2* | 1/2019 | Hinrichs ............... | G06F 3/0482 |
| 10,289,683 | B2* | 5/2019 | Robert .................. | G06F 16/116 |
| 10,545,640 | B1* | 1/2020 | Yu ....................... | G06Q 30/0623 |
| 10,785,282 | B2* | 9/2020 | Lyons ................... | G06F 16/958 |
| 2003/0014415 | A1* | 1/2003 | Weiss ................... | G06F 16/9577 |
| 2009/0259936 | A1 | 10/2009 | Tanskanen et al. | |
| 2010/0153544 | A1* | 6/2010 | Krassner ............. | G06F 16/9577 709/224 |
| 2013/0018960 | A1 | 1/2013 | Knysz et al. | |
| 2013/0151963 | A1* | 6/2013 | Costenaro ........... | G06F 3/04817 715/711 |
| 2014/0033006 | A1 | 1/2014 | Easter et al. | |
| 2014/0136942 | A1 | 5/2014 | Kumar et al. | |

(Continued)

FOREIGN PATENT DOCUMENTS

WO WO2013/116395 8/2013
WO WO2019021048 1/2019

*Primary Examiner* — Huawen A Peng
(74) *Attorney, Agent, or Firm* — Brownstein Hyatt Farber Schreck, LLP

(57) ABSTRACT

Described herein is a computer implemented method comprising: receiving, at a collaboration system, a page view request from a user device, the page review request being in respect of a page; identifying a content item link in the page for which a preview should be generated; generating a preview generation request for the user device to generate a preview in respect of the identified content item by a preview generation application installed on the user device; receiving, by the collaboration system, the preview generated by the preview generation application installed on the user device; and storing, by the collaboration system, the preview.

20 Claims, 7 Drawing Sheets

(56) References Cited

U.S. PATENT DOCUMENTS

| | | | |
|---|---|---|---|
| 2014/0379824 A1* | 12/2014 | Wang | H04L 51/046 709/206 |
| 2016/0019306 A1 | 1/2016 | Jung | |
| 2016/0132937 A1* | 5/2016 | Khoo | H04L 51/00 705/14.66 |
| 2016/0173560 A1* | 6/2016 | Datta | G06F 16/9535 709/203 |
| 2016/0283085 A1* | 9/2016 | Beausoleil | G06F 3/04847 |
| 2017/0039168 A1 | 2/2017 | Hassan et al. | |
| 2018/0033064 A1 | 1/2018 | Varley | |
| 2019/0052701 A1* | 2/2019 | Rathod | H04L 67/22 |

* cited by examiner

SYSTEMS AND METHODS FOR GENERATING DIGITAL CONTENT ITEM PREVIEWS

CROSS-REFERENCE TO RELATED APPLICATION(S)

This application claims the benefit of Australian patent application no. AU2019902266, filed Jun. 28, 2019 and titled "Systems and Methods for Generating Digital Content Item Previews," the disclosure of which is hereby incorporated herein by reference in its entirety.

TECHNICAL FIELD

The present disclosure is directed to systems and methods for generating digital content item previews.

BACKGROUND

Various types of collaboration systems exist that allow users to share content with other users. For example, users of a collaboration system such as Confluence (developed by Atlassian) can create pages which can then be viewed by other users. Such pages can include in-page content as well as links to digital content items—e.g. documents, images, presentations, videos, and a vast array of other types of digital content items.

The systems and techniques described herein may be used to generate a preview of an item or a link included in a collaboration system. The systems and techniques described herein may provide performance benefits and increased functionality over some traditional collaboration systems.

Figure 1:
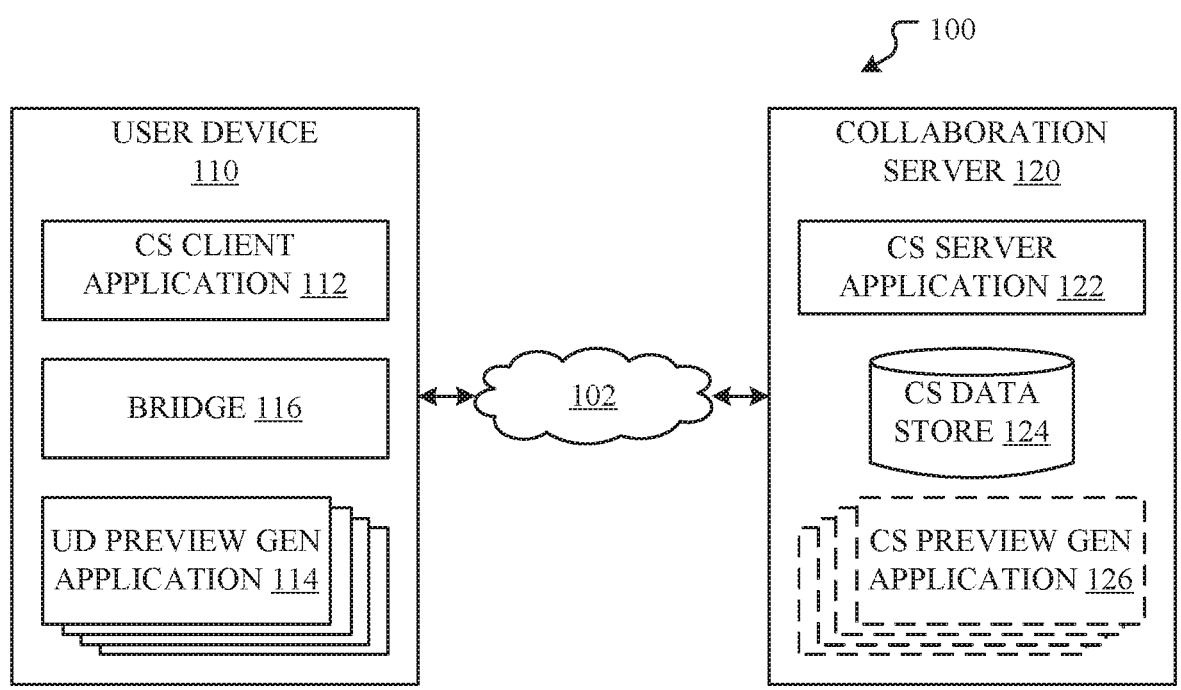
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Various types of collaboration systems allow users to create pages in order to share content. Two examples of such systems are Confluence (by Atlassian) and Sharepoint (by Microsoft). Such collaboration systems are typically client-server systems: the server provides an interface (via a client) for users to create pages, stores pages and associated content, and responds to client requests to view pages.

In such systems, users can create pages that include both in-page content as well as links to digital content items (content items for short). When a page is requested by a client of the collaboration system, in-page content (typically text and images) is served with the page and displayed in the page when the page is rendered on a user device by the client.

Links are also served with the page in order to be displayed, however the actual content items referenced by such links (which will be referred to as linked content items) are not served and displayed unless specifically requested by the client (e.g. by a user activating the link). In order to improve usability, however, if a preview of the digital content item is available the server will serve the preview for display with the page.

Many different types of digital content items can be linked to in a page, for example: document content items (such as those generated by Word, Pages, Acrobat, or alternative programs); drawing/image content items (such as those generated by Visio, Lucidchart, Sketchup, Photoshop, or alternative programs, and images generated by hardware devices such as cameras, e.g. .jpg, .tif, and alternatively formatted image content items); 3D content items (such as .stl, .obj, .fbx and alternatively formatted 3D content items); audio content items (such as .wav, .mp3, .FLAC, and alternatively formatted audio content items); video content items (such as those generated by Final Cut, Adobe Premiere KineMaster, Corel VideoStudio, or alternative programs and video generated by hardware devices such as cameras, e.g. MPEG 4 and alternatively formatted video content items); presentation content items (such as those generated by Powerpoint, Keynote, or alternative programs); spreadsheet content items (such as those generated by Excel, Numbers, Sheets, or alternatively programs); and any other type of content item.

The present disclosure provides systems and methods for generating digital content item previews, and in particular for generating previews using software applications running on a user device rather than the collaboration system server. As noted in the background, one example of a digital content item preview is an image (e.g. a thumbnail image of a photo, document, presentation, video frame, or the like). More generally, in the present specification, a preview of a digital content item is a preview of the content of that digital content item.

The present disclosure focuses on collaboration systems which allow users to create web pages—e.g. systems such as Confluence (by Atlassian) and Sharepoint (by Microsoft). The techniques described herein can, however, be used for any type of collaboration system which generates digital content item previews.

Initially, a high-level overview of the various systems involved in the present disclosure will be provided. This is followed by a description of a computer processing system that can be configured to perform various operations and functions described herein. Operations performed in order to generate digital content item previews will then be described.

Environment Overview

FIG. 1 illustrates an example environment 100 in which embodiments and features of the present disclosure are implemented. Environment 100 includes a communications network 102 which interconnects end user devices (such as user device 110) with a collaboration system 120. For brevity, the acronym CS will at times be used in place of 'collaboration system'.

User Device 110

User device 110 is a computer processing system which, in use, is operated by an end user. User device 110 includes a collaboration system client application 112: i.e. computer readable instructions and data. When executed by the user device 110 (e.g. by a processor thereof), the client application 112 configures the user device 110 to provide client-side collaboration system functionality. Generally speaking, client-side CS functionality includes generating interfaces for display on the user device 110 which allow a user to interact with the collaboration system 120 to, for example, create new pages, edit existing pages, and view pages. Further client-side CS functionality is described below.

Client application 112 may be a dedicated application that communicates with the collaboration system server application 122 via defined API calls. Alternatively, client application 112 may be a web browser application (such as Chrome, Safari, Internet Explorer, Firefox, or an alternative web browser) that communicates with the collaboration system server application 122 using http/https protocols.

User device 110 also includes one or more user device preview generation applications 114. As used herein, a preview generation application 114 is a software application capable of processing a digital content item to generate a preview thereof. As a general proposition, the application or program used to create a particular content item can be used to generate a preview of that content item. For example, the Microsoft Word program can be used to create .doc content items and generate previews of .doc content items. Similarly the Apple Pages application/program can be used to create .pages content items and generate previews of .pages content items. Similarly the Adobe Photoshop application/program can be used to create image content items and generate previews of image content items.

A user device preview generation application is a preview generation application installed on/executed by a user device 110 (as opposed to a CS preview generation application 126 which is installed on/executed by a CS 120).

User device 110 also includes a bridge 116 which, as described further below, provides a link between the client application 112 and preview generation application(s) 114 installed on the user device 110. In certain implementations the functionality of the bridge 116 is provided by the client application 112. In alternative implementations, bridge 116 is separate to the client application 112 (e.g. a stand-alone application or part of another application installed on the user device) and is invoked by the client application 112 as required.

Although not shown, user device 110 will also have other software applications installed/running thereon, for example an operating system.

User device 110 may be any form of computing device. Typically, user device 110 will be a personal computing device—e.g. a desktop computer, laptop computer, tablet computer, mobile phone, or other personal computing device.

While environment 100 depicts a single user device 110 any implementation of the present disclosure will typically involve multiple user devices 110 (operated by multiple users) interacting with collaboration system 120.

Collaboration System 120

Collaboration system 120 includes a collaboration system server application 122 and a collaboration system data store 124.

When executed, the CS server application 122 configures the CS 120 to provide server-side collaboration system functionality. Generally speaking, server-side CS functionality includes receiving and responding to client application requests (e.g. requests from CS client application 112) to create/edit/view pages. The CS server application 122 may be a web server (for interacting with web browser clients) or an application server (for interacting with dedicated application clients). While illustrated with a single collaboration system server application 122, CS 120 may run multiple server applications (e.g. one or more web servers and/or one or more application servers).

The CS server application 122 interacts with the CS data store 124 in order to store and retrieve various data required for the operation of the CS 120. Such data includes, for example, user account data, page data (including both page content and page metadata), content items (uploaded by users and linked to in pages), and any other data involved in the operation of the CS 120. The CS data store 124 may run on the same physical computer system as the collaboration system server application 122, or may run on its own dedicated computer system (accessible to collaboration system server application(s) 122 either directly or via a communications network). CS data store 124 may include a database system, a shared file system, and/or any other data storage system facilitating the storage and retrieval of data.

In the illustrated embodiment, CS 120 also includes one or more CS preview generation applications 126 (as noted above, applications capable of processing a digital content item to generate a preview thereof). Notably, however, in alternative embodiments the CS 120 does not include any CS preview generation application 126. This is, in fact, an advantage provided by the present disclosure, namely that the CS 120 does not need to execute any preview generation software/application.

The particular components/devices of collaboration system 120 can vary significantly depending on the type of collaboration system and its implementation. For example, a given CS may be a cloud hosted system or an on-site hosted system. Further, a CS designed for use by a small number of users may have a single collaboration system server application (running on a single server computer), while a larger scale system may provide multiple server applications running on multiple server computers. As a further example, a given collaboration system may be a scalable system including multiple distributed server nodes connected to one or more shared data stores (e.g. data store 124). Depending on demand from clients (and/or other performance requirements), collaboration system server nodes can be provisioned/de-provisioned on demand to increase/decrease the number of servers offered by the collaboration system server 120. Each collaboration system server application 122 may run on a separate computer system and include one or more application programs, libraries, APIs or other software that implement server-side functionality.

The collaboration system server application 122 (running on collaboration system 120) and collaboration system client application 112 (running on user device 110) operate together to provide collaboration system functionality.

Hardware Overview

The embodiments and features described herein are implemented by one or more special-purpose computing systems or devices. For example, in environment 100 each of the user device 110 and CS 120 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a server computer system, a desktop computer system, a portable computer system, a handheld device, a networking device or any other device that incorporates hard-wired and/or program logic to implement relevant operations.

Figure 2:
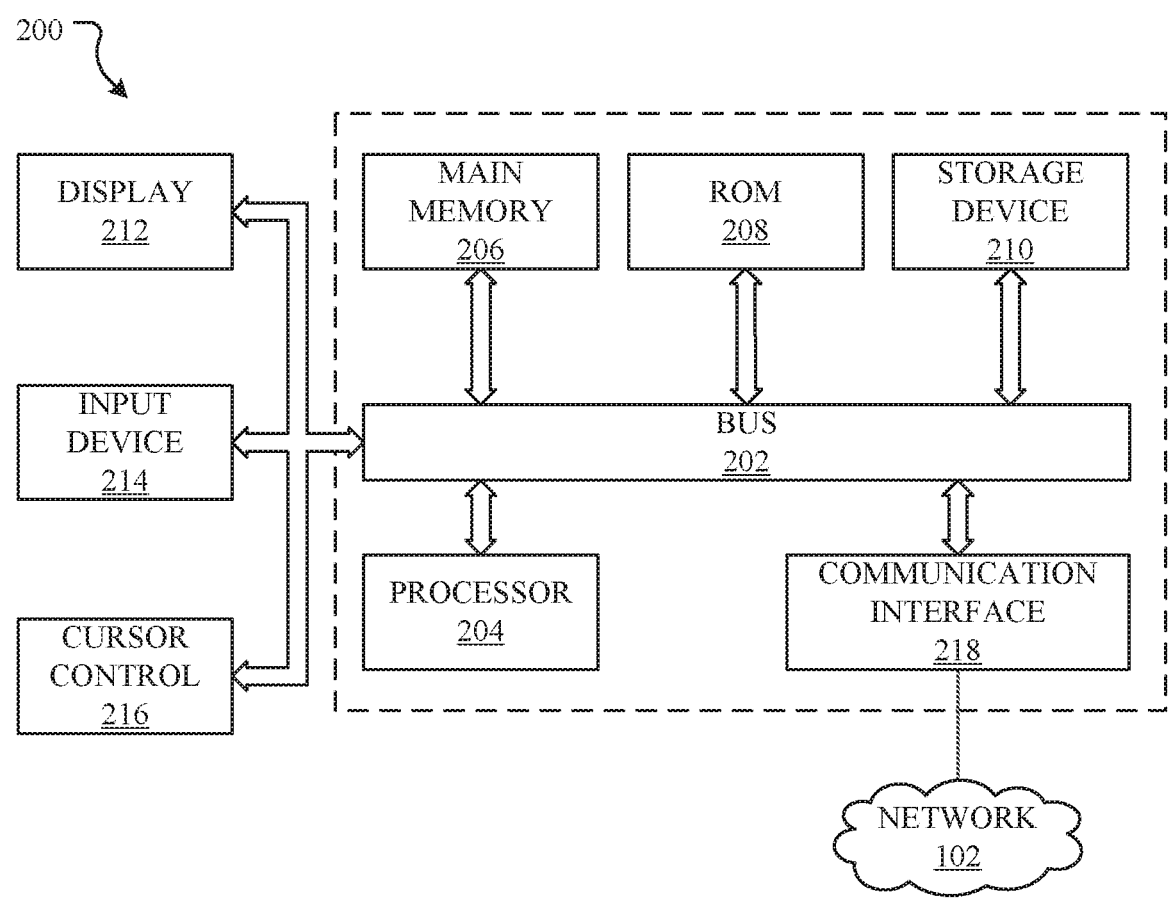
FIG. 2 is a block diagram of a computing system which is configurable to implement various embodiments and features of the present disclosure.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to certain embodiments, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. For example, each of the collaboration system client application 112, bridge 116, user device preview generation application 114, collaboration system server application 122, and CS preview generation application 124 may be instructions and data executable by a processor such as 204. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as in a CS 120), it will typically be provided with higher end hardware allowing it to process data, access memory, and perform network communications more rapidly than, for example, a user device (such as device 110) which will typically be a personal computer system such as a phone, tablet, laptop computer or desktop computer.

Collaboration System Operation

As described above, collaboration systems such as CS 120 allow users to create pages including both in-page content and links to digital content items. Pages that have been created by users (and associated data) are stored in CS data store 124. In some cases, when a user creates a page with a link to a digital content item the user uploads that digital content item and it too is stored (in this embodiment) in CS data store. In other cases, a user may link to a digital content item that is hosted by a third party server (i.e. a server other than the collaboration system server 122).

In certain embodiments, when a user creates a page with (or edits a page to include) a link to a digital content item, the CS server application 122 determines whether it can create a preview of the content item. To do so the CS server application 122 accesses the content item (either from data store 124 or a remote location indicated by the link) and determines the type or format of the content item (based, for example, on a file name extension, metadata associated with the content item, or header information of the content item). The CS server application 122 then determines whether it can generate a preview for a content item of that particular type. This can be achieved in various ways. For example, the CS 120 may maintain a data structure maintaining records on CS preview generation applications 126 that are installed on the CS 120 and, for each application 126, the type(s) of content item(s) that application 126 can generate previews for (e g similar to the preview generation application data structures described below). In this case, determining whether a preview for a given content item can be generated involves querying the data structure to determine whether any of the CS preview generation applications 126 are capable of handling content items of the required type. If a CS preview generation applications 126 capable of generating previews for the type of content item in question exists, the CS server application 122 invokes the relevant application 126 to generate a preview, which is then stored in the CS data store 124 (and associated with the page in question). If no CS preview generation application 126 capable of generating previews for the type of content item in question exists, no preview is generated.

In alternative embodiments, however, the CS 120 does not have any CS preview generation applications 126 installed thereon. In these embodiments, when a user creates a page with a link to a content item the CS server application 122 does not generate a preview of the content item.

Overall Preview Generation Process

Figure 3:
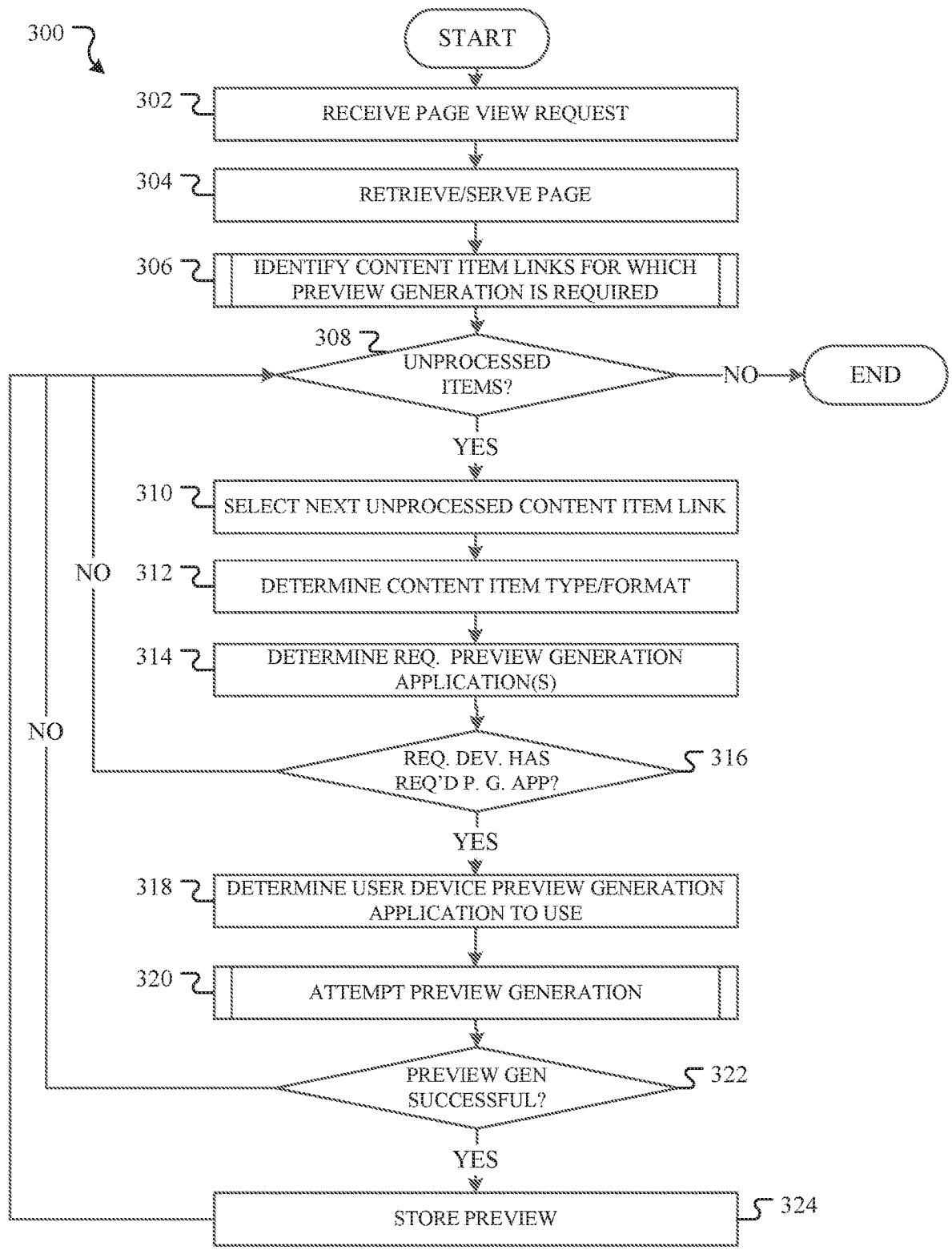
FIG. 3 is a flowchart depicting a process for generating content item previews.

Turning to FIG. 3, a process for generating content item previews 300 using UD preview generation applications 114 will be described.

Process 300 commences at 302 when the CS server application 122 receives a request from a client application 112 to view a page hosted by the CS 120. The request includes a page identifier (e.g. a url or other identifier) allowing the particular page to be identified.

At 304, the CS server application 122 retrieves the page identified in the request from the CS data store 124 and serves this to the requesting CS client application 112 (which renders the page on the user device 110). While in the present embodiment the CS server application 122 is configured to serve the page immediately on receiving the request it could, in alternative embodiments, be configured to serve the page at an alternative time—for example after completing process 300. Serving the page after the completion of process 300 has the advantage of being able to include any content item previews generated during process 300 at the same time as serving the rest of the page content. It may, however, introduce a delay in serving the page while the operations of process 300 are completed.

At 306, the CS server application 122 analyses the page data to identify any content item links therein for which previews need to be generated. Two alternative identification processes 400 and 500 (in accordance with alternative embodiments) are described below with reference to FIGS. 4 and 5. In short, however, in process 400 the CS server application 122 identifies any content item links in the page that do not have an associated preview. In process 500 the CS server application 122 identifies any content item links in the page that either do not have an associated preview or have a sub-optimal associated preview. In the present embodiment, at 306 the CS server application 122 generates a record (e.g. a list) of content item links for which previews need to be generated.

At 308, the CS server application 122 determines whether any content item links identified at 306 have not yet been processed. If unprocessed content item links exist (or no content item links are identified at 306), processing continues to 310. If not, process 300 ends.

At 310, the CS server application 122 selects the next unprocessed content item link for processing. In embodiments where operation 306 generates a list of content item links for which previews need to be generated, the list can be traversed in any order to (eventually) process all identified content item links.

At 312, the CS server application 122 determines the type of the content item referenced by the content item link selected at 310. The CS server application 122 can be configured to determine the type of the content item in various ways, for example by reference to a file name extension of the remote content item, file header information, or other metadata associated with the file.

In certain embodiments, the CS server application 122 retrieves the data necessary to determine the file type at (or prior to) operation 310. Where the linked content item has been uploaded to the CS 120 the data necessary to determine the file type is retrieved by the CS server application 122 from the CS data store 124. Where the linked content item is maintained by a remote server (e.g. a third party web server), the CS server application 122 retrieves the data necessary to determine the file type of the linked content item from that remote server.

In other embodiments, the CS server application 122 determines the type of the linked content item at the time the page is created (or edited to include the link) and stores type data in the page data itself. This prevents the need for the linked content item (or, specifically, the data required to determine the file type) to be retrieved from the CS data store 124 or remote server each time process 300 occurs.

At 314, the CS server application 122 determines what preview generation application(s) is/are required to generate a preview for the content item. This determination is made by reference to the type of the content item as identified at 314 and a preview generation application data structure storing information as to what preview generation applications are capable of generating previews for what content item types.

In certain embodiments, each record of the preview generation application data structure includes a content item type identifier (identifying a particular content item type) and a preview generation application identifier (identifying a particular application capable of generating a preview for the associated content type). One example of such a data structure—in a table format—is provided in Table A below (though alternative data structures with alternative fields are possible):

TABLE A

Example preview generation application data structure

| Record ID | Content type identifier | Preview generation application |
|---|---|---|
| 001 | .doc/.docx | Microsoft Office/Word |
| 002 | .pages | Apple iWork/Pages |
| 003 | .xls/.xlsx | Microsoft Office/Excel |
| 004 | .numbers | Apple iWork/Numbers |
| 005 | .pdf | Adobe Acrobat |
| 006 | .keynote | Apple iWork/Keynote |
| 007 | .psd | Adobe Photoshop |
| 008 | .pxm | Pixelmator |

In alternative embodiments, each record of the preview generation application data structure further includes an optimality rank (or other indicator) indicating how optimal the preview generated by the preview generation application for the content item type is. This accounts for the fact that for a given content item type there may be several preview generation applications capable of generating a preview, but the quality of the previews generated by those application may differ. In this case, the optimality rank allows the most optimal preview generation application to be identified. One example of such a data structure—in a table format—is provided in Table B below (though alternative data structures with alternative fields are possible). In the example of Table B, the optimality rank is an integer with lower integers indicating more optimal preview generation than higher integers—i.e. so that a preview generation application with optimality rank n (e.g. 1) is preferred over a preview generation application with optimality rank >n (e.g. 3).

TABLE B

Example preview generation application data structure

| Record ID | Content type | Preview generation | Optimality rank |
|---|---|---|---|
| 001 | .doc/.docx | Microsoft Office/Word | 1 |
| 002 | .doc/.docx | LibreOffice | 2 |
| 003 | .xls/.xlsx | Microsoft Office/Excel | 1 |
| 004 | .xls/.xlsx | LibreOffice | 2 |
| 005 | .pages | Apple iWork/Pages | 1 |
| 006 | .numbers | Apple iWork/Numbers | 1 |
| 007 | .keynote | Apple iWork/Keynote | 1 |
| 008 | .psd | Adobe Photoshop | 1 |
| 009 | .psd | ImageMagick | 2 |
| 010 | .pdf | Adobe Acrobat | 1 |
| 011 | .pdf | Microsoft Word | 2 |
| 012 | .pdf | Apple Pages | 2 |

In both of the examples above, in order to determine the required preview generation application(s) the CS server application 122 queries the data structure to identify any/all preview generation applications that are capable of generating a preview of the content item type determined at 312.

Figure 6:
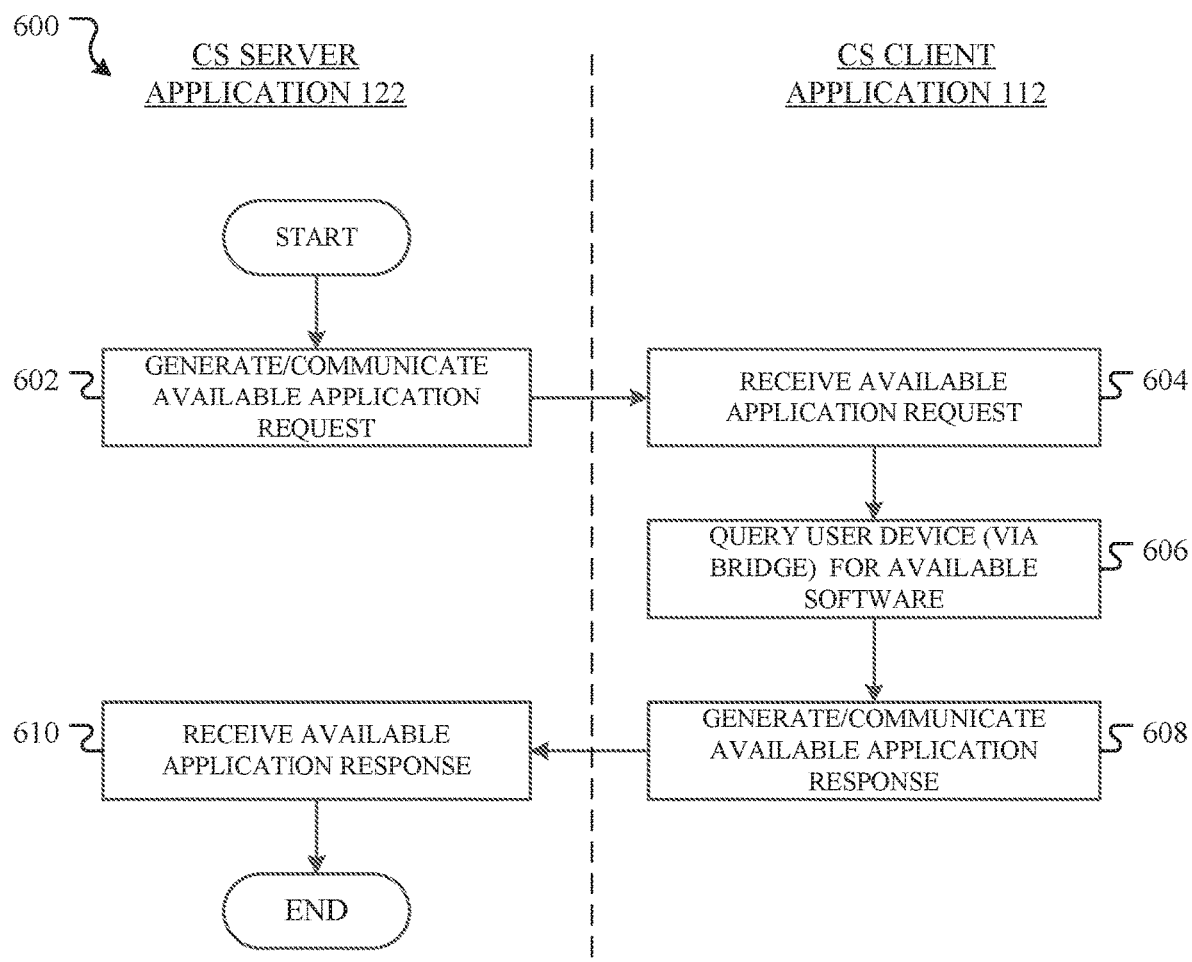
FIG. 6 is a flowchart depicting a process for determining whether a user device has one or more preview generation applications installed thereon.

At 316, the CS server application 122 determines whether the requestor user device (i.e. the user device from which the page view request was received at 302) has one or more preview generation applications installed thereon that could be used to generate a preview of the content item in question. If so, processing continues to 320. If not, the user device cannot generate a preview for the particular content item and processing returns to 308. The determination at 316 can be made in various ways, with an example process 600 described below with respect to FIG. 6.

At 318, the CS server application 122 determines which user device preview generation application 114 is to be used to attempt to generate a preview of the content item. If a single user device preview generation application 114 is identified at 316, that application is selected. If more than one user device preview generation application 114 is identified at 316 either: an application is arbitrarily selected (e.g. the first application returned) if no application optimality data is maintained; or, where application optimality data is maintained (e.g. per Table B above), the application capable of generating the most optimal preview is selected.

Figure 7:
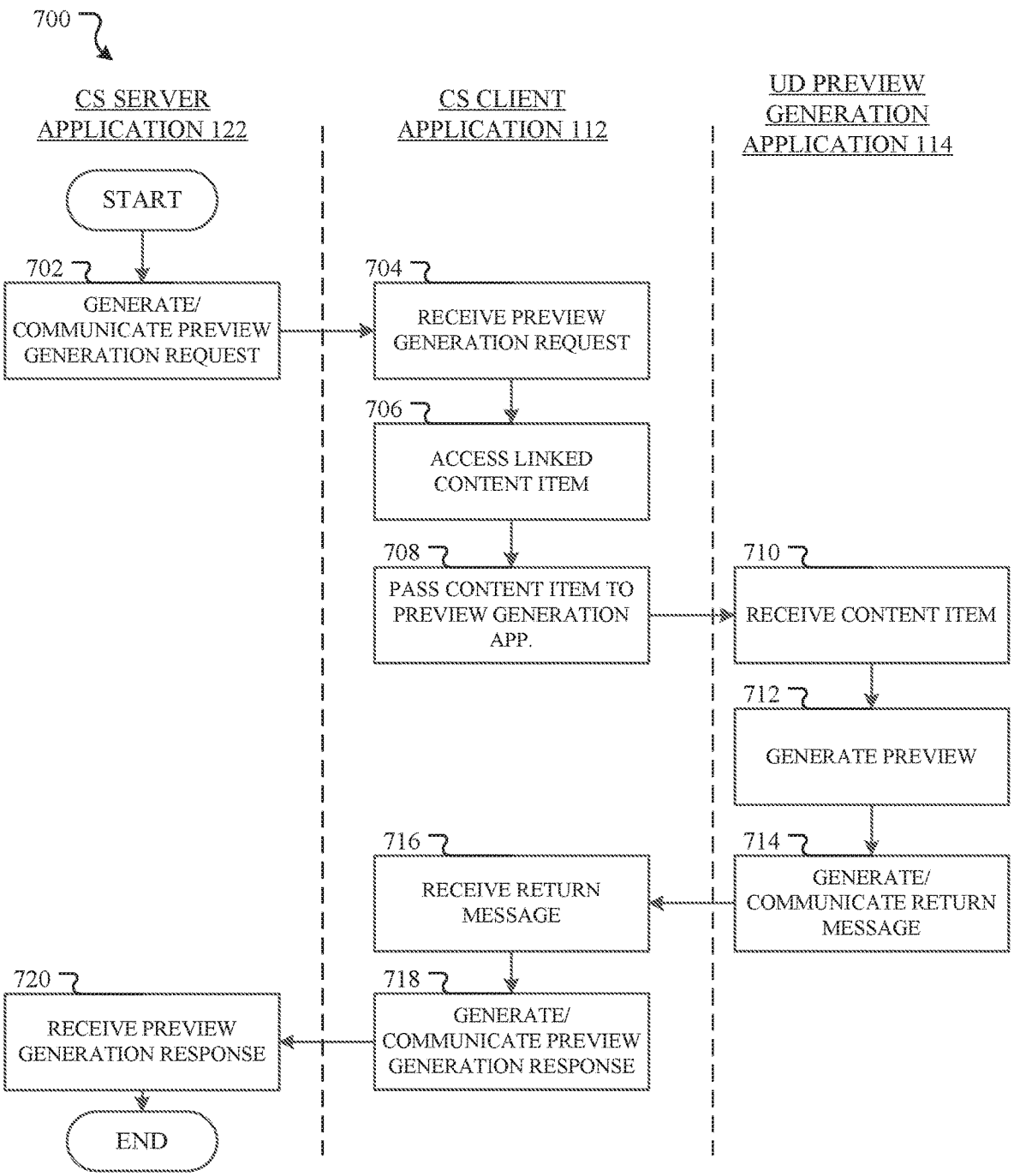
FIG. 7 is a flowchart depicting a process for causing a preview to be generated by a preview generation application operating on a user device.

At 320, the CS server application 122 attempts to cause the user device to generate a preview of the content item using the application determined at 318. This can be achieved in various ways, with an example process 700 described below with respect to FIG. 7. The output of process 700 is a preview generation response received by the CS server application 122 from the CS client device 112. If the preview generation is successful, the preview generation response includes at least a preview file/data stream. If not, the response (or lack of a response) indicates that the preview generation was unsuccessful.

At 322, the CS server application 122 determines whether the preview generation was successful. If so, processing continues to 324. If not, processing returns to 308 in the present embodiment and no preview is generated. In alternative embodiments, if the preview generation was not successful the CS server application 122 determines whether the requestor user device 110 has an alternative preview generation application installed thereon that is capable of generating a preview and returns to 320 to attempt generation of a preview using the alternative application.

At 324, the CS server application 122 stores the preview generated at 320 in the CS data store 124 (the preview being associated with the link/page in question). Processing then returns to 308.

Content Item Link Identification

As noted above, at 306, the CS server application 122 analyses a page to identify any content item links therein for which previews need to be generated. This section describes two alternative identification processes 400 and 500 in accordance with alternative embodiments.

Figure 4:
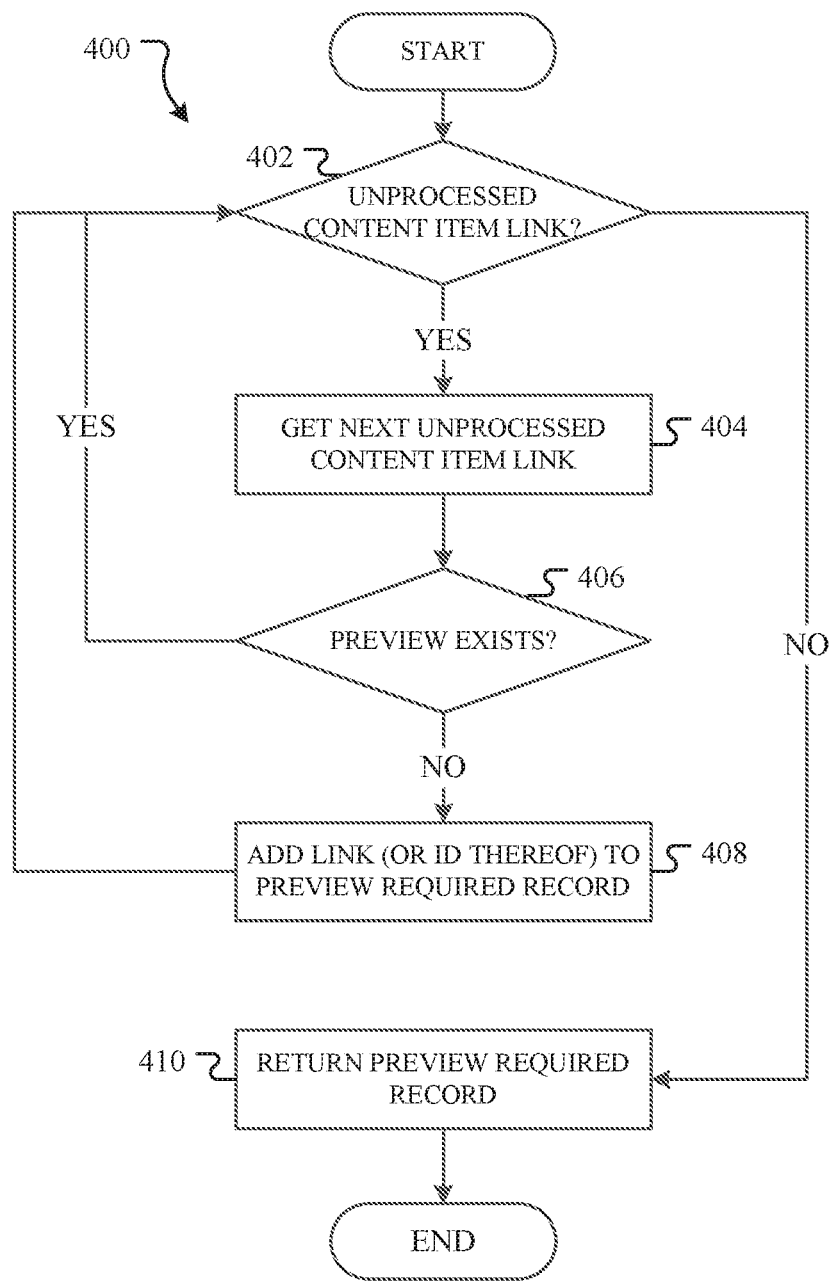
FIG. 4 is a flowchart depicting a process for identifying content item links in a page for which previews need to be generated.

Turning initially to identification process 400 of FIG. 4.

At 402, the CS server application 122 analyses the page in question to determine whether the page includes an unprocessed content item link (i.e. a content item link for which the operations following 402 have not been performed). Analysis of the page can be done in various ways, for example by traversing the page until a content item link is identified. If the page includes an unprocessed content item link, processing continues to 404. If not processing continues to 410.

At 404, the CS server application 122 selects the next unprocessed content item link.

At 406, the CS server application 122 determines whether a preview for the content item link exists. This can be done in various ways. For example, the page itself may already include the preview. Alternatively, the content item link may have metadata indicating that a preview exists—and potentially the location of that preview as stored, for example, on the CS data store 124. If a preview exists, processing returns to 402. If not, processing continues to 408.

At 408, the CS server application 122 adds the content item link (or an identifier thereof) to a preview required record (e.g. a list or other data set). Processing then returns to 402.

At 410, the CS server application 122 has determined that the page does not include any further (or any) unprocessed content item links. In this case the preview required record—which includes content item links (or identifiers thereof) for which previews need to be generated is returned. If there are no content item links for which previews need to be generated an empty preview required record can be returned, or an alternative output indicating that no links require previews to be generated. Process 400 then ends.

Figure 5:
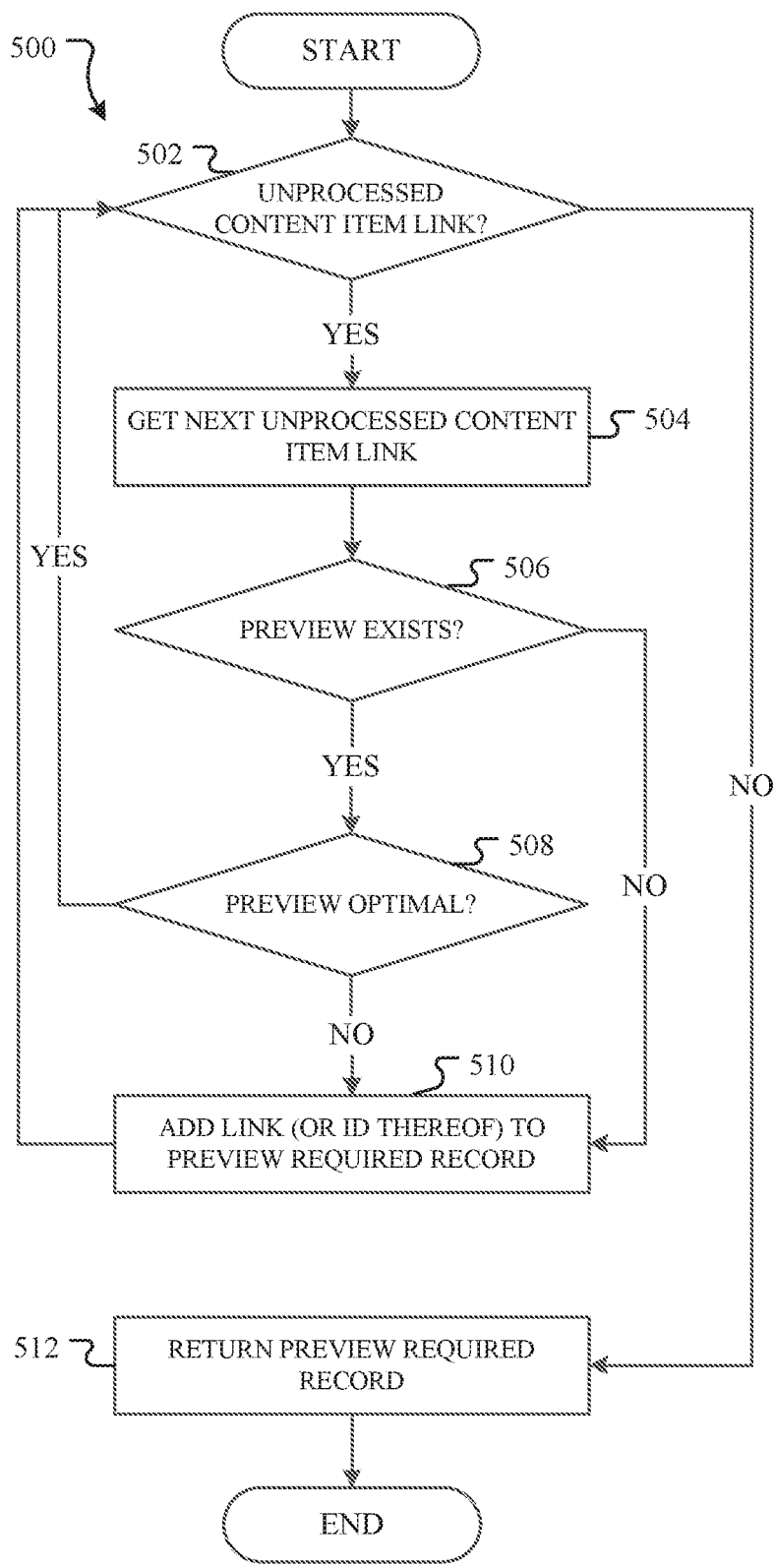
FIG. 5 is a flowchart depicting an alternative process for identifying content item links in a page for which previews need to be generated.

Turning now to identification process 500 of FIG. 5.

At 502, the CS server application 122 analyses the page in question to determine whether the page includes an unprocessed content item link. This can be performed in the same matter as operation 402 described above. If the page does include an unprocessed content item link, processing continues to 504. If not processing continues to 512.

At 504, the CS server application 122 selects the next unprocessed content item link.

At 506, the CS server application 122 determines whether a preview for the content item link exists. This can be performed in the same matter as operation 406 described above. If a preview exists, processing continues to 508. If a preview does not exist, processing continues to 510.

At 508, the CS server application 122 has determined that a preview exists. In this case, the CS server application 122 determines whether the existing preview for the linked content item is optimal or not. If the existing preview is optimal, no preview needs to be generated and processing returns to 502. If the existing preview is not optimal, it may be the case that a more optimal preview can be generated and processing proceeds to 510.

Determining whether the existing preview is optimal can be performed in various ways. For example, the CS server application 122 can identify the format/type of the linked content item (as described above) and the preview generation application that was used to generate the preview (e.g. from metadata associated with the preview). This can then be compared against a data structure such as Table B described above to determine the optimality rank of the preview generation application. If an alternative preview generation application having a more favourable optimality rank exists for the linked content item type the CS server application 122 determines that the existing preview is not optimal. Otherwise the CS server application 122 determines that the existing preview is optimal.

At 510, the CS server application 122 has either determined that no preview exists (per 506) or that a sub-optimal preview exists (per 508). In this case, the CS server application 122 adds the content item link (or an identifier thereof) to a preview required record (e.g. a list or other dataset). Where a sub-optimal preview exists, the CS server application 122 can include an identifier of the preview generation application that was used to generate the existing preview (which can be used in downstream processing to determine whether the user device is capable of generating a more optimal preview). Processing then returns to 502.

At 512, the CS server application 122 has determined that the page does not include any further (or any) unprocessed content item links. In this case the preview required record—which includes at least content item links (or identifiers thereof) for which previews need to be generated is returned. If there are no content item links for which previews need to be generated an empty preview required record can be returned, or an alternative output indicating that no links require previews to be generated. Process 500 then ends.

Determining Preview Generation Application(s) Available on User Device

At 316 of process 300 the CS server application 122 determines whether the requestor user device 110 has installed thereon any preview generation application(s) that could be used to generate a preview of the linked content item in question. An example process for doing so will be described with reference to flowchart 600 of FIG. 6.

At 602, the CS server application 122 generates an available application request and communicates this to the CS client application 112. The available application request includes identifiers of one or more preview generation applications that could be used to generate a preview of the content item (for example as determined at 314 of process 300).

At 604, the CS client application 112 receives the available application request.

At 606, the CS client application 112 queries the user device 110 to determine whether it has any of the preview generation applications included in the available application request. In the present embodiment this is done via the bridge 116 which determines the applications that are installed/available on the user device 110, e.g. by piggybacking on the extension →application(s) mapping of the operating system.

At 608, the CS client application 112 generates an available application response and communicates this to the CS server application 122. The available application response includes identifiers of any preview generation applications that were included in the available application response message and which are installed on the user device 110.

At 610, the CS server application 122 receives the available application response. Process 600 then ends.

Preview Generation

At 320 of process 300, the CS server application 122 attempts to cause generation of a preview of the content item by a preview generation application 114 installed on the user device 110. One process 700 for achieving this will be described with reference to FIG. 7.

At 702, the CS server application 122 generates and communicates a preview generation request to the CS client application 112. The preview generation request includes the content item link (or data identifying the link) along with an identifier of the preview generation application that is to be used to generate a preview of the linked content item (as identified at 318).

At 704, the CS client application 112 receives the preview generation request from the CS server application 122.

At 706, the CS client application 112 accesses (e.g. downloads) the linked content item referenced by the content item link included in the preview generation request.

At 708, the CS client application 112 passes the linked content item to the preview generation application 114 identified in the preview generation request along with a command to generate a preview of the linked content item. In the present embodiment interaction with the preview generation application 114 is performed by the bridge 116 which interfaces with the relevant software application to cause the application to generate a preview (e.g. by calling the application with a command line option to generate the preview, or via an automation tool such as AppleScript/Automator).

At 710, the preview generation application 114 receives the content item and preview generation command from the CS client application 112 (or bridge 116).

At 712, the preview generation application 114 attempts to generate a preview of the content item per normal operation of the preview generation application 114.

At 714, the preview generation application 114 generates and passes a return message to the CS client application 112 (or bridge 116). If generation of the preview was successful, the return message includes the generated preview (or a pointer to the location of the generated preview on memory of the user device 110). If not the return message includes a message or code indicating that a preview could not be generated.

At 716, the CS client application 112 receives the return message from the preview generation application 114 (via bridge 116).

At 718, the CS client application 112 generates and communicates a preview generation response to the CS server application 122. If generation of the preview at 712 was successful, the preview generation response includes at least the preview generated by the user device at 708 (and may also include the associated content item link). If not, the preview generation response includes data indicating that the preview could not be generated.

At 720, the CS server application 122 receives the preview generation response from the CS client application 112. Process 700 then ends.

In certain embodiments the preview generation processes described above are transparent to the user of the user device 110—i.e. performed automatically by the CS client application 112, bridge 116, and relevant UD preview generation application(s) 114.

In alternative embodiments the preview generation process is only performed if explicit user consent has been obtained. Such consent can be obtained in various ways. For example, the CS client application 112 may be configured to generate an ongoing consent interface at certain time(s) (e.g. when first run, at the first time a preview is to be generated, periodically). The ongoing consent interface can ask the user for their consent for the CS 120 to use the user's device 110/preview generation application(s) to generate previews. Alternatively, the CS client application 112 can be configured to request user consent each time a preview is to be generated. This can be done, for example, following operation 604 of process 600—i.e. after the CS client application 112 receives an available application request the CS client application generates a consent interface asking the user if they consent to the CS client application trying to use any preview generation application(s) installed on the user device 110 to generate previews. If consent is not given the process would end.

The processes 300 described above involve attempting to generate previews on a linked content item-by-linked content item basis. Preview generation could alternatively be attempted in a batch mode. For example, and generally speaking, the CS server application 112 can be configured to: generate a list of all content item links in a page for which previews are required (e.g. along similar lines to 306 and 308); generate a list (or other record) of all the different content item types and associated preview generation applications (e.g. along similar lines to 312 and 314); send a list of all preview generation applications to the CS client application 112 to determine which, if any, are installed on the client device 110 (e.g. along similar lines to 316); determine all linked content items that the user device 110 can potentially generate previews for and send a message to the CS client application 112 including those content item links. The CS client application 112 can then be configured to attempt preview generation of all linked content items in the received list and return any successfully generated previews to the CS server application 122.

Still further alternatively, rather than automatically identifying all content items in a given page for which previews are to be created, the CS server application 112 may be configured to only attempt preview creation for content items that a user actively views. For example, the CS server application 112 can be configured to detect a user activating a link associated with a content item, determine if a preview (or optimal preview) for that content item exists, and if no preview exists (or a sub-optimal preview exists) attempt to generate a preview for that content item using the techniques described above (e.g. per process 400 or 500, the main difference being that there is a single content item link to be considered—namely the content item the user has actively viewed).

In the embodiments described above, the CS server application handles determination of whether the generation of preview items is required (e.g. at 306) and, if so, downstream processing to identify an appropriate preview generation application and cause a user device to generate a preview. In alternative embodiments, these operations can be performed by the CS client application 112 running on the user device. For example, the CS server application 122 can be configured to respond to a page request normally. On receiving the page from the server, the CS client application 112 can then identify content item links for which preview generation is required (e.g. per 306), determine a suitable preview generation application(s) (e.g. per 312/314), determine whether a suitable preview generation application is available on the user device 110, and, if so, generate a preview and communicate this back to the CS server application 112 to be stored.

In either case, determination of whether a preview should be generated (and downstream generation thereof) is automatically performed by either the CS server application 122 or the CS client application 112.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. Although these flowcharts define steps in particular orders to explain various features, in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps. Still further, the functionality/processing of a given flowchart step could potentially be performed by various different systems or applications.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method comprising:
receiving, at a collaboration system, a page view request from a user device, the page view request being in respect of a page;
identifying a content item link in the page for which a preview should be generated, the content item link being in respect of a content item;
causing generation of a preview in respect of the content item by a preview generation application installed on the user device by:
generating a preview generation request for the user device to generate the preview in respect of the content item; and
communicating the preview generation request to the user device;
receiving, by the collaboration system, the preview generated by the preview generation application installed on the user device; and
storing, by the collaboration system, the preview.

2. The computer implemented method of claim 1, wherein prior to causing generation of the preview generation request the method further comprises:
determining a type of the content item;
determining a particular preview generation application capable of generating the preview for content items of the determined type; and
determining that the particular preview generation application is available on the user device.

3. The computer implemented method of claim 1, wherein identifying the content item link in the page for which the preview should be generated comprises identifying the content item link in the page for which no preview exists.

4. The computer implemented method of claim 1, wherein identifying the content item link in the page for which the preview should be generated comprises identifying the content item link in the page for which a sub-optimal preview exists.

5. The computer implemented method of claim 4, wherein identifying the content item link in the page for which the sub-optimal preview exists comprises:
determining that the preview for the content item exists;
determining a particular preview generation application associated with a first optimality rank that was used to generate the existing preview; and
determining that an additional preview generation application associated with a second optimality rank higher than the first optimality rank of the particular preview generation application exists.

6. The computer implemented method of claim 5, wherein determining that the additional preview generation application exists comprises referencing a data structure, the data structure storing a plurality of data records, each data record comprising:
a content type identifier identifying a specific content type;
a preview generation application identifier identifying a specific preview generation application capable of generating previews of the specific content type; and
an optimality rank indicating the optimality of previews generated by the specific preview generation application for the specific content type.

7. The computer implemented method of claim 6, wherein the data structure stores:
a first data record having a first content type identifier identifying a first content type and a first preview generation application identifier identifying a first preview generation application; and
a second data record having a second content type identifier identifying the first content type and a second preview generation application identifier identifying a second preview generation application, the second preview generation application being different from the first preview generation application.

8. The computer implemented method of claim 1, wherein the preview generation request includes the content item link and an identifier of the preview generation application.

9. A computer implemented method comprising:
requesting, by a user device, a page from a collaboration system;
receiving, by the user device, the page, the page including a content item link;
determining a preview in respect of a content item associated with the content item link is to be generated by receiving, at the user device, a preview generation request from the collaboration system;
accessing, by the user device, the content item;
generating, by the user device, a preview for the content item using a preview generation application installed on the user device; and
communicating the preview to the collaboration system.

10. The computer implemented method of claim 9, wherein the preview generation request received from the collaboration system includes an identifier of a particular preview generation application, and wherein generation of the preview is performed using the particular preview generation application.

11. The computer implemented method of claim 9, wherein determining the preview in respect of the content item associated with the content item link is to be generated comprises determining, by the user device, that no preview for the content item exists.

12. The computer implemented method of claim 9, wherein determining the preview in respect of the content item associated with the content item link is to be generated comprises determining, by the user device, that a sub-optimal preview for the content item exists.

13. The computer implemented method of claim 9, wherein the content item is accessed from the collaboration system.

14. The computer implemented method of claim 9, further comprising, after communicating the preview to the collaboration system, selecting an unprocessed content item link on the page.

15. A computer system comprising:
a processor;
a communication interface; and
a non-transitory computer-readable storage medium storing sequences of instructions, which when executed by the processor, cause the processor to:
receive, via the communication interface, a page view request from a user device, the page view request being in respect of a page;

identify a content item link in the page for which a preview should be generated, the content item link being in respect of a content item;

cause generation of a preview in respect of the content item by a preview generation application installed on the user device by:

generating a preview generation request for the user device to generate the preview in respect of the content item; and communicating the preview generation request to the user device;

receive, via the communication interface, a preview generated by the preview generation application installed on the user device; and store the preview.

16. The computer system of claim 15, wherein prior to causing generation of the preview generation request, the sequences of instructions, when executed by the processor, cause the processor to:

determine a type of the content item;

determine a particular preview generation application capable of generating the preview for content items of the determined type; and determine that the particular preview generation application is installed in the user device.

17. The computer system of claim 15, wherein identifying the content item link in the page for which the preview should be generated comprises identifying the content item link in the page for which no preview exists.

18. The computer system of claim 15, wherein identifying the content item link in the page for which the preview should be generated comprises identifying the content item link in the page for which a sub-optimal preview exists.

19. The computer system of claim 18, wherein identifying the content item link in the page for which the sub-optimal preview exists comprises:

determining that the preview for the content item exists;

determining a particular preview generation application that was used to generate the existing preview, the particular preview generation application associated with a first optimality rank; and determining that an additional preview generation application associated with a second optimality rank higher than the first optimality rank of the particular preview generation application exists.

20. The computer system of claim 15, wherein the non-transitory computer-readable storage medium further causes the processor to, after communicating the preview to the collaboration system, select an unprocessed content item link on the page.

* * * * *